US012668157B2

(12) United States Patent
Kim et al.

(10) Patent No.: US 12,668,157 B2
(45) Date of Patent: Jun. 30, 2026

(54) POWER SWIVEL DEVICE

(71) Applicant: DAEWONSANUP CO., LTD., Ansan-si (KR)

(72) Inventors: Hyuk Kim, Ansan-si (KR); Sang Yong Koo, Incheon (KR); Joo Hyun Cho, Ansan-si (KR)

(73) Assignee: DAEWONSANUP CO., LTD., Ansan-si (KR)

( * ) Notice: Subject to any disclaimer, the term of this patent is extended or adjusted under 35 U.S.C. 154(b) by 140 days.

(21) Appl. No.: 18/640,754

(22) Filed: Apr. 19, 2024

(65) Prior Publication Data

US 2024/0359598 A1 Oct. 31, 2024

(30) Foreign Application Priority Data

Apr. 25, 2023 (KR) ........................ 10-2023-0054170

(51) Int. Cl.
*B60N 2/14* (2006.01)
*B60N 2/02* (2006.01)

(52) U.S. Cl.
CPC ............ *B60N 2/14* (2013.01); *B60N 2/02253* (2023.08); *B60N 2/02258* (2023.08)

(58) Field of Classification Search
CPC .................................. B60N 2/14; B60N 2/146
See application file for complete search history.

(56) References Cited

U.S. PATENT DOCUMENTS

| | | | | |
|---|---|---|---|---|
| 5,292,179 | A | * | 3/1994 | Forget ...................... B60N 2/20 |
| | | | | 248/425 |
| 11,001,169 | B2 | | 5/2021 | Jang et al. |
| 2022/0348114 | A1 | | 11/2022 | Lee et al. |

FOREIGN PATENT DOCUMENTS

| | | | | |
|---|---|---|---|---|
| KR | 10-2020-0078903 A | | 7/2020 | |
| KR | 10-2351262 B1 | | 1/2022 | |
| KR | 102349791 B1 | * | 1/2022 | .............. B60N 2/14 |
| KR | 10-2022-0149139 A | | 11/2022 | |
| KR | 10-2023-0009614 A | | 1/2023 | |
| KR | 10-2023-0046741 A | | 4/2023 | |
| KR | 20230046741 A | * | 4/2023 | .............. B60N 2/14 |

* cited by examiner

*Primary Examiner* — Timothy D Collins
*Assistant Examiner* — Terri L Filosi
(74) *Attorney, Agent, or Firm* — Bridgeway IP Law Group, PLLC; Sang Ho Lee; Hyun Woo Shin

(57) ABSTRACT

The present disclosure relates to a power swivel device for preventing spacing or jamming caused by individual component tolerances, assembly tolerances, accumulated tolerances, environment, etc. and may include a fixing base installed in a body or a seat of a vehicle; a rotary plate rotatably installed on the fixing base and on which a driven gear part is formed on an inner surface or an outer surface; a variable actuator device which swivels and rotates the rotary plate relative to the fixing base by utilizing a drive gear engaged with the driven gear part of the rotary plate, wherein position of the drive gear is variably installed relative to the fixing base; and an elastic pressurization device for elastically pressurizing the variable actuator device such that the drive gear is elastically pressurized in a direction to the driven gear part.

15 Claims, 15 Drawing Sheets

POWER SWIVEL DEVICE

CROSS-REFERENCE TO RELATED APPLICATION(S)

This application is based on and claims priority of Korean Patent Application No. 10-2023-0054170, filed on Apr. 25, 2023, with the Korean Intellectual Property Office, the entire contents of which are hereby incorporated by reference.

STATEMENT REGARDING SPONSORED RESEARCH OR DEVELOPMENT

The research and development of the present invention were conducted with the support of the Korea Institute of Advancement of Technology (KIAT) with the financial resources of the Ministry of Trade, Industry and Energy (MOTIE) from the World Class Plus Program (Project Number: P0021941, Detailed Project identifier: 1415189597).

TECHNICAL FIELD

The present disclosure relates to a power swivel device, and more particularly to a power swivel device capable of preventing spacing or jamming caused by individual component tolerance, assembly tolerance, accumulated tolerance, environment, etc.

BACKGROUND

Generally, a power swivel device can be applied to a vehicle seat to swivel and rotate the seat. A driving device having a gear combination that rotates a driven gear part formed on an inner surface or an outer surface of a rotary plate with a drive gear such as a pinion gear may be applied to the power swivel device.

Such conventional power swivel device had problems of motor overload, operation stall, etc. caused by jamming wherein excessive overlap of a driven gear part and a drive gear due to individual component tolerance of each component, assembly tolerance such as misalignment of a rotation axis during assembly, accumulated tolerance caused by accumulation of allowable tolerances of components, and environment tolerance caused by temperature, humidity, etc.

On the other hand, if the driven gear part and the drive gear did not fit closely together due to wear of parts between the driven gear part and the drive gear, or if excessive spacing or depression groove was caused by a bearing between a fixing base and a rotary plate, rotational power could not be transmitted properly. In severe cases, there were various problems such as a seat shaking when swiveling due to backlash, noise, or vibration caused by collision between components.

In addition, the conventional power swivel device had problems such as easy failure or breakage of the drive gear, a motor, or a reduction gear box because a load or impact applied to the seat is transmitted directly to the drive gear through the rotating plate due to use environment of a vehicle or characteristics of the seat.

SUMMARY

The present disclosure is intended to address various problems including the ones mentioned above, and aims to provide a power swivel device configured to prevent spacing or jamming caused by individual component tolerance, assembly tolerance, accumulated tolerance, environment, etc. However, these problems are exemplary and do not limit the scope of the present disclosure.

According to an aspect of the present disclosure, a power swivel device may comprise a fixing base installed in a body or a seat of a vehicle; a rotary plate rotatably installed on the fixing base and on which a driven gear part is formed on an inner surface or an outer surface; a variable actuator device which swivels and rotates the rotary plate relative to the fixing base by utilizing a drive gear engaged with the driven gear part of the rotary plate, wherein position of the drive gear is variably installed relative to the fixing base; and an elastic pressurization device for elastically pressurizing the variable actuator device such that the drive gear is elastically pressurized in a direction to the driven gear part.

Further, according to the present disclosure, the elastic pressurization device may comprise a fixing block fixed to the fixing base, wherein an opening is formed in a direction of the variable actuator device, and a storage space is formed; and an elastic member wherein at least a part of which is stored in the storage space of the fixing block and whose leading end protrudes out of the fixing block through the opening and acts on a restoring force in a direction of pressing the variable actuator device.

Further, according to the present disclosure, the elastic pressurization device may further comprise an elastic adjustment device which adjusts the restoring force of the elastic member.

Further, according to the present disclosure, the elastic adjustment device may further comprise a guide which supports a rear end of the elastic member and is installed to be able to move forward and backward along the storage space of the fixing block; and an elastic adjuster which is screwed together with the fixing block to adjust forward and backward position of the guide and move the elastic member forward and backward by screwing.

Further, according to the present disclosure, the variable actuator device may be a rotating type variable actuator device which is rotatably installed based on swing axis installed on one side of the fixing base.

Further, according to the present disclosure, the rotating type variable actuator device may comprise a rotating bracket wherein a portion of which is penetrated by the swing axis to enable rotation; and an actuator which is installed on the rotating bracket so that it can be rotated together with the rotating bracket, comprising the drive gear, a motor which rotates the drive gear, and a reduction gear box which decelerates and transmits driving force of the motor to the drive gear.

Further, according to the present disclosure, the rotating bracket may comprise an axis support piece formed in a portion to rotationally support a rotation axis of the drive gear such that two ends of the drive gear are rigidly coupled, and a through-hole formed in another portion such that a portion of the reduction gear box can be pierced.

Further, according to the present disclosure, the variable actuator device may be a sliding type variable actuator device that is slidably installed with a fixing block of the elastic pressurization device.

Further, according to the present disclosure, the sliding type variable actuator device may comprise a sliding bracket wherein a portion of which is slidably formed along a rail part of the fixing base of the elastic pressurization device; and an actuator which is installed on the sliding bracket so that it can be slid together with the sliding bracket, comprising the drive gear, a motor which rotates the drive gear, and a reduction gear box which decelerates and transmits driving force of the motor to the drive gear.

Further, according to the present disclosure, the fixing base may comprise a first fixing plate which is installed on a lower side of the rotary plate with a retainer and a ball bearing installed on an upper surface; and a second fixing plate which is installed an upper side of the rotary plate with the retainer and the ball bearing installed on a lower surface.

According to some embodiments of the present disclosure as described above, it is possible to prevent the spacing or jamming caused by the individual component tolerance, assembly tolerance, accumulated tolerance, or the environment by elastically pressurizing the driven gear part with the drive gear, prevent motor overload or malfunction by aligning the driven gear part and the drive gear to a precise position, improve transmission efficiency of rotational power, prevent shaking of the seat caused by a backlash, prevent collision between components, noise or vibration, and the elastic pressurization device may cushion external load or impact transmitted to the seat, the rotary plate, the driven gear part and the drive gear, thereby dramatically improving durability and lifespan of the components and making elastic deformation distance smaller than disengagement distance to prevent gear disengagement. However, the scope of the present disclosure is not limited by these effects.

DETAILED DESCRIPTION OF EXEMPLARY EMBODIMENTS

Figure 1:
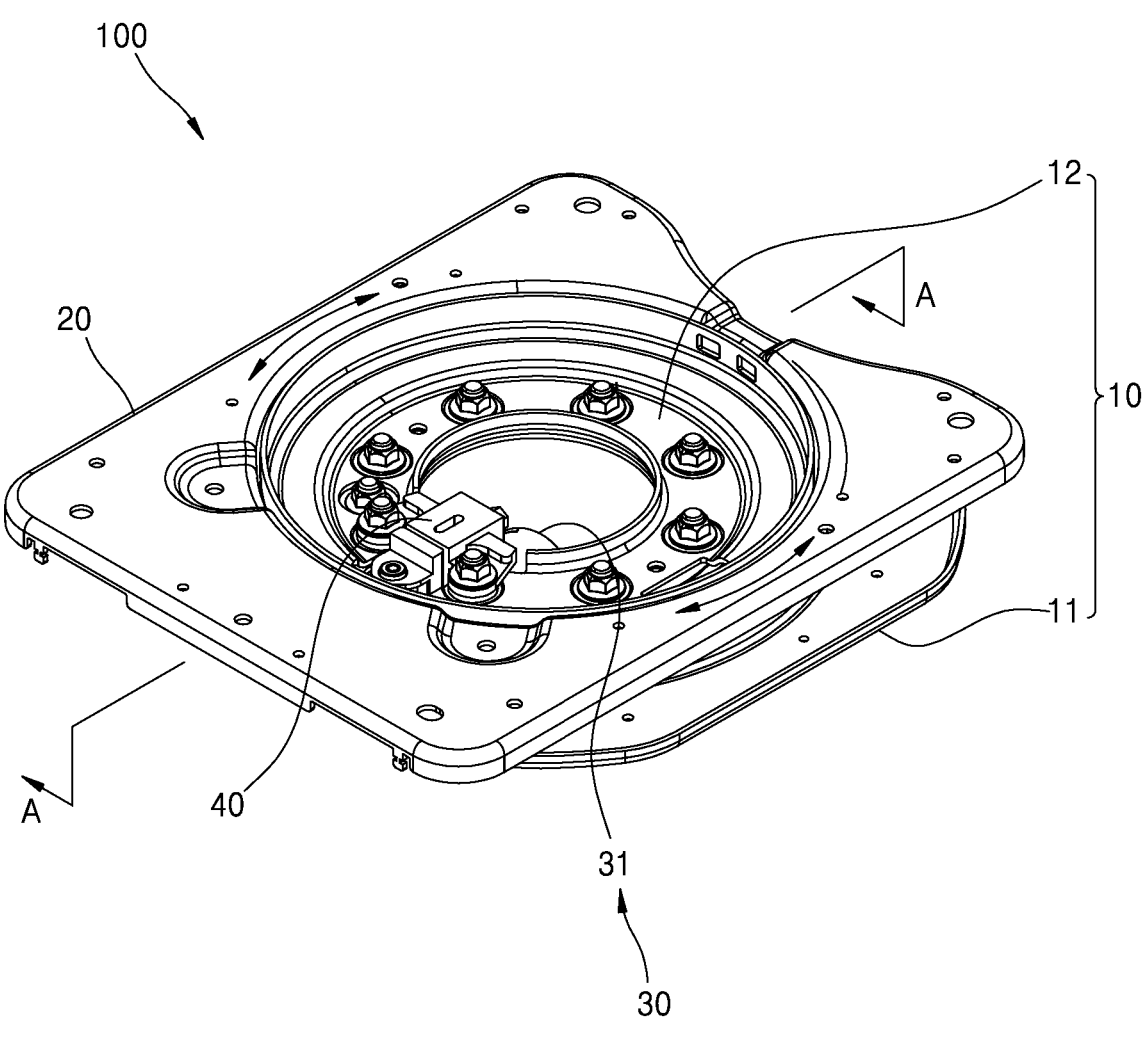
FIG. 1 is a perspective view illustrating a top view of a power swivel device according to some embodiments of the present disclosure.

Hereinafter, the present disclosure will be described in detail by explaining embodiments of the present disclosure with reference to the attached drawings.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art. Also, in the drawings, the thicknesses or sizes of layers are exaggerated for clarity.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, the embodiments of the present disclosure should not be construed as limited to the particular shapes of regions illustrated herein, but are to include deviations in shapes that result, for example, from manufacturing.

Hereinafter, the power swivel device in accordance with various embodiments of the present disclosure will be described in detail with reference to the drawings.

Figure 2:
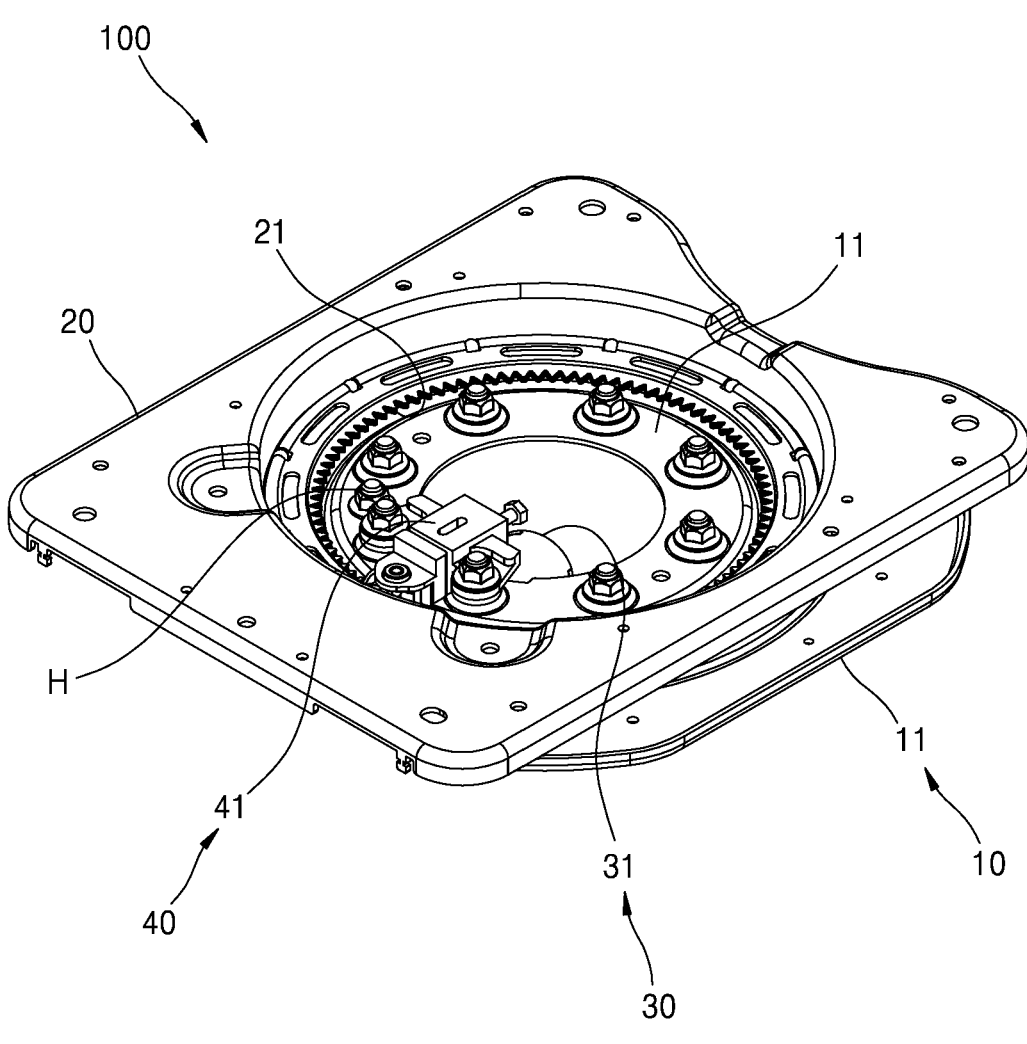
FIG. 2 is a perspective view showing the power swivel device of FIG. 1 with a second fixing plate removed.
Figure 3:
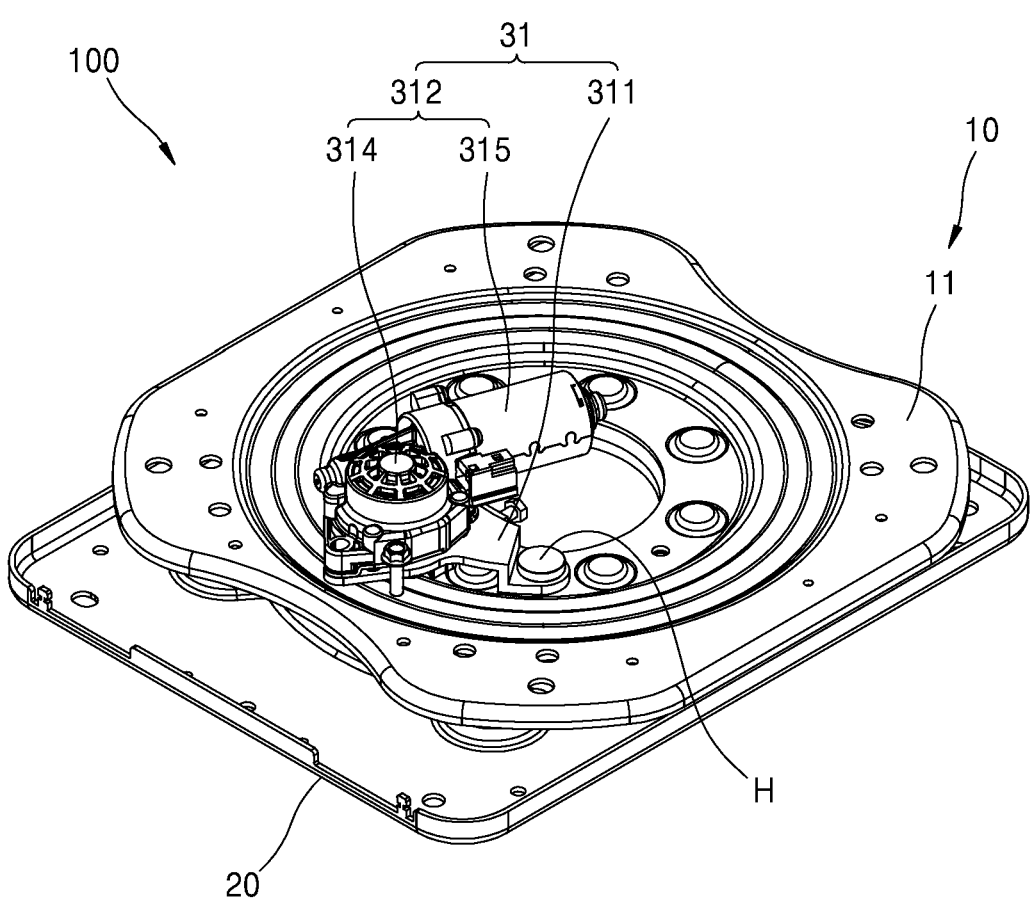
FIG. 3 is a perspective view illustrating the power swivel device of FIG. 1 inverted to show a bottom surface.
Figure 4:
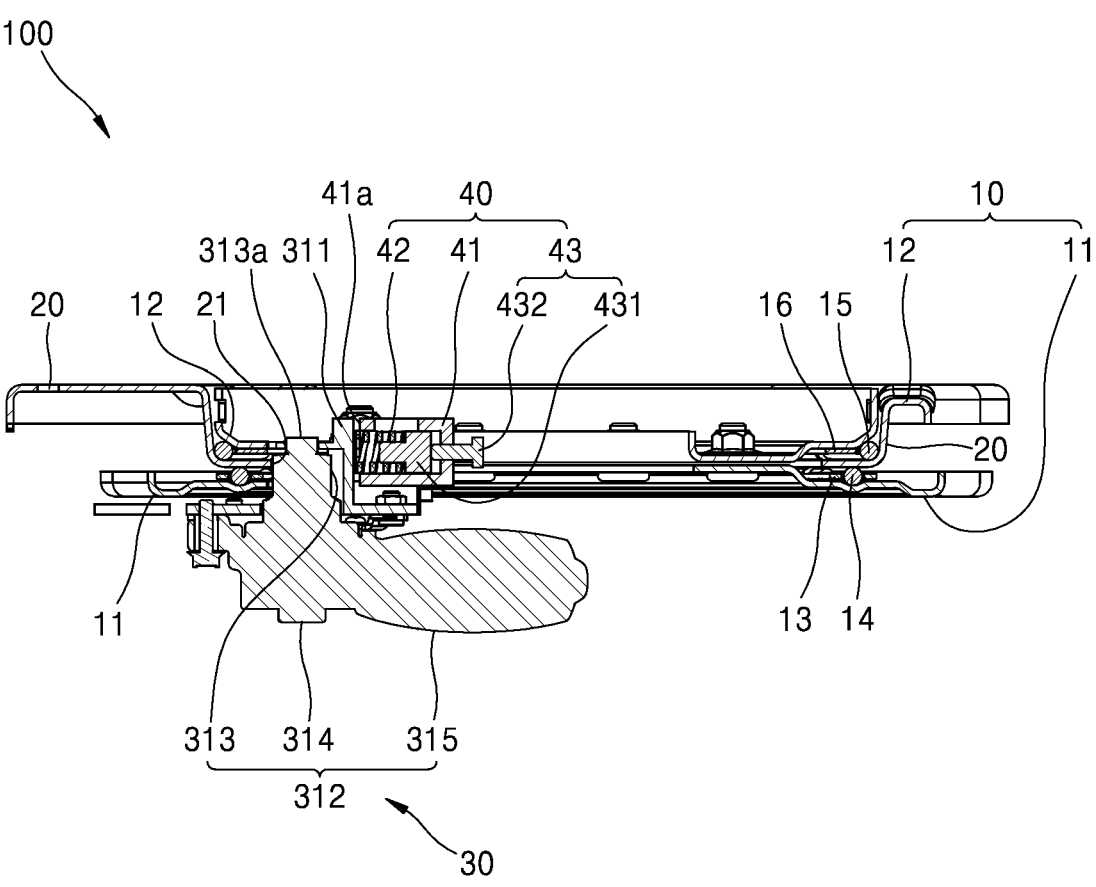
FIG. 4 is a cross-sectional view taken along a line A-A of the power swivel device of FIG. 1.
Figure 5:
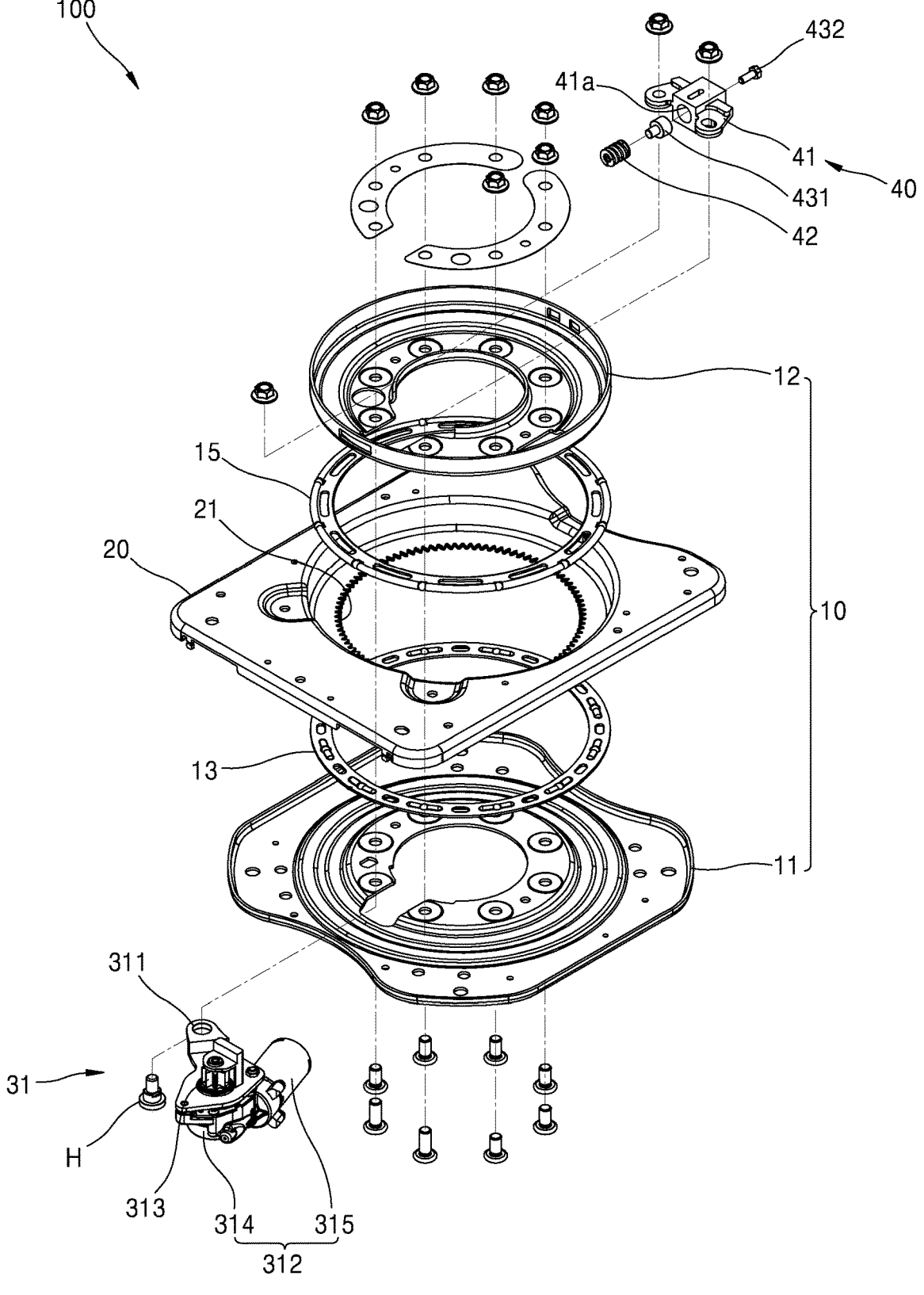
FIG. 5 is a part exploded perspective view illustrating the power swivel device of FIG. 1.

FIG. 1 is a perspective view illustrating a top view of the power swivel device 100 according to some embodiments of the present disclosure, FIG. 2 is a perspective view showing the power swivel device 100 of FIG. 1 with a second fixing plate 12 removed, FIG. 3 is a perspective view illustrating the power swivel device 100 of FIG. 1 inverted to show a bottom surface, FIG. 4 is a cross-sectional view taken along a line A-A of the power swivel device 100 of FIG. 1, and FIG. 5 is a part exploded perspective view illustrating the power swivel device 100 of FIG. 1.

First, as shown in FIG. 1 to 5, the power swivel device 100 according to some embodiments of the present disclosure may include a fixing base 10, a rotary plate 20, a variable actuator device 30, and an elastic pressurization device 40.

The fixing base 10 is a structure fixed to the body of a vehicle, such as a cabin floor, a seat base, or an upper rail of a slide device, that may support the rotary plate 20, the variable actuator device 30, and the elastic pressurization device 40, and may be a rotationally fixed structure that does not rotate relative to the rotary plate 20.

The fixing base 10, as shown in FIG. 4, may include a first fixing plate 11, which is installed on the lower side of the rotary plate 20 with a retainer 13 and a ball bearing 14 installed on an upper surface of the first fixing plate 11, and a second fixing plate 12, which is installed on the upper side of the rotary plate 20 with a retainer 15 and a ball bearing 16 installed on a lower surface of the second fixing plate 12.

Therefore, the first fixing plate 11 and the second fixing plate 12 of the fixing base 10 may support the top surface and bottom surface of the rotary plate 20 to be able to roll with the retainer 13, 15 and the ball bearing 14, 16, respectively, with freedom of rotation and minimal friction force. Structurally, the first fixing plate 11 and the second fixing plate 12 may also firmly support the upper and lower surfaces of the rotary plate 20, that is, both sides of the rotary plate 20, so that the load or impact of the seat transmitted to rotary plate 20 may be evenly distributed, and the rigidity and durability of the device may be greatly improved.

The first fixing plate 11 and the second fixing plate 12 of the fixing base 10, together with the rotary plate 20, may be hollow to allow wires to pass inside, and may be formed into a ring shape that is generally round or square. However, these first fixing plate 11 and second fixing plate 12 are not necessarily limited to these, and many different types and shapes of fixtures may all be applicable.

The fixing base 10 is not necessarily limited to the drawings, and may be installed on the seat side rather than the body side of the vehicle, and may be formed in a variety of other shapes and structures.

The rotary plate 20 is rotatably installed between the first fixing plate 11 and the second fixing plate 12 of the fixing base 10, such that a driven gear part 21 in the form of a ring gear may be formed in an inner surface, and the overall structure may be a ring-shaped structure.

The driven gear part 21 formed at the inner surface of the rotary plate 20 is engaged with the drive gear 313, and when the drive gear 313 is rotated forward by the reduction gear box 314 and the motor 315, the rotary plate 20 engaged with it can be rotated forward.

The rotary plate 20 is also formed in a hollow shape so that wires can pass inside, and can be formed in an overall circular or square ring shape. However, this rotary plate 20 is not necessarily limited to this, and many different types and shapes of rotating bodies may all be applicable.

Therefore, the friction force between the upper and lower surfaces of the rotary plate 20 can be minimized by the retainer 13, 15 and the ball bearing 14, 16 installed on the first fixing plate 11 and the second fixing plate 12 of the fixing base 10, thereby increasing power transmission efficiency when the rotary plate 20 rotates. In addition, the retainer 13, 15 and ball bearing 14, 16 installed on the first fixing plate 11 and the second fixing plate 12 of the fixing base 10 may evenly distribute the load or impact of the seat, which greatly improves the rigidity of the device and durability, as well as minimizing any shaking, noise, or vibration that may occur between the parts.

The variable actuator device 30 is a type of driving device that swivels and rotates the rotary plate 20 relative to the fixing base 10 by utilizing the drive gear 313, such as a pinion gear, engaged with the driven gear part 21, such as a ring gear of the rotary plate 20. The variable actuator device 30 may be installed so that the position of the drive gear 313, which will be described later, may be moved forward and backward based on the fixing base 10.

The elastic pressurization device 40 may be a device for elastically pressurizing the variable actuator device 30 such that the drive gear 313 is elastically pressurized in the direction to the driven gear part 21.

The elastic pressurization device 40, as shown in FIGS. 4 and 5, may include a fixing block 41, an elastic member 42, and an elastic adjustment device 43.

The fixing block 41 is fixed to the fixing base 10 with a fixture such as a bolt, nut, or screw, and may be an overall box-shaped structure that includes an opening 41a formed in the direction to the variable actuator device 30 and has a storage space formed inside.

The elastic member 42 may be a coil spring whose middle and rear ends are stored in the storage space of the fixing block 41, and whose leading end protrudes out of the fixing block 41 through the opening 41a of the fixing block 41 and acts on a restoring force in the direction of pressing the variable actuator device 30. However, the elastic member 42 is not necessarily limited to the drawings, and in addition to coil springs, various elastic members having a restoring force, such as elastic blocks or leaf springs made of rubber or silicone, may be applied.

The elastic adjustment device 43 is a device that precisely adjusts the restoring force of the elastic member 42, which pressurizes the variable actuator device 30. This allows the tooth pressure between the driven gear part 21 of the rotary plate 20 and the drive gear 313 to be adjusted to be neither too tight nor too loose.

The elastic adjustment device 43 may include, for example, a guide 431, which supports the rear end of the elastic member 42 and is installed to be able to move forward and backward along the storage space of the fixing block 41, and an elastic adjuster 432, which is screwed together with the fixing block 41 to adjust the forward and backward position of the guide 431 and move the elastic member 42 forward and backward by screwing.

According to the elastic adjustment device 43, when the guide 431 is moved forward and backward by rotating the elastic adjuster 432, the compressed length of the elastic member 42 is shortened or increased, which reduces or increases the elasticity of the restoring force. Therefore, the tooth pressure between the driven gear part 21 of the rotary plate 20 and the drive gear 313 should be adjusted appropriately so that they are not too tight or too loose.

Figure 6:
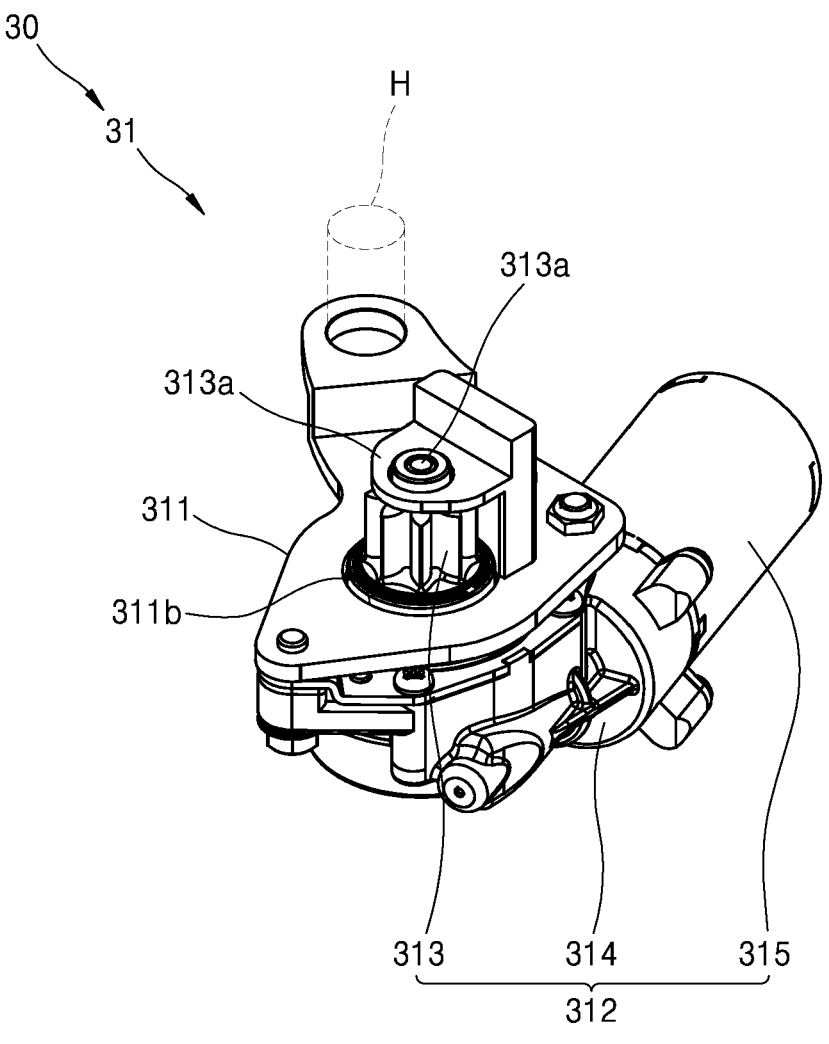
FIG. 6 is a perspective view illustrating a variable actuator device of the power swivel device of FIG. 5.
Figure 7:
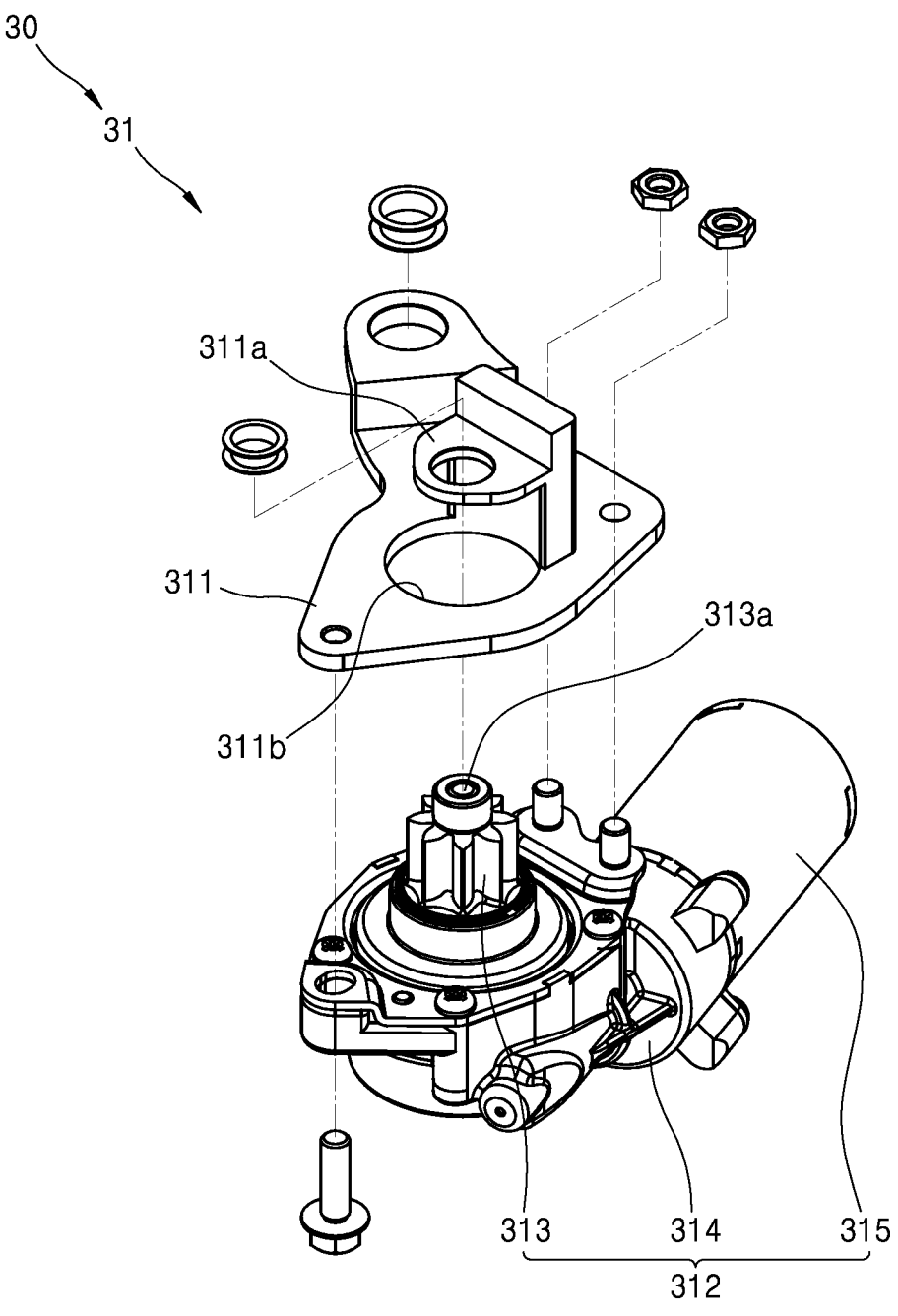
FIG. 7 is a part exploded perspective view illustrating the variable actuator device of the power swivel device of FIG. 6.
Figure 8:
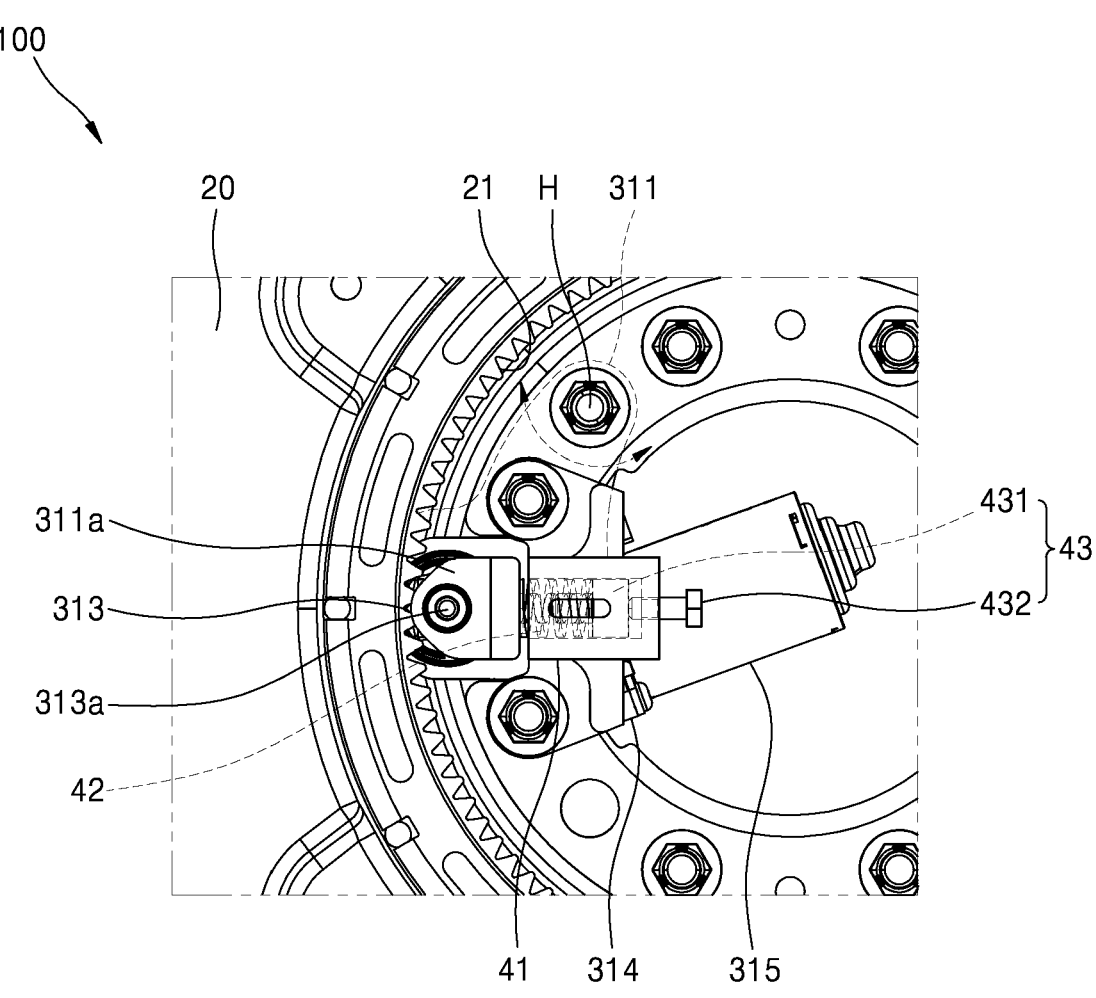
FIG. 8 is a top plan view illustrating an operation process of the power swivel device of FIG. 1.
Figure 9:
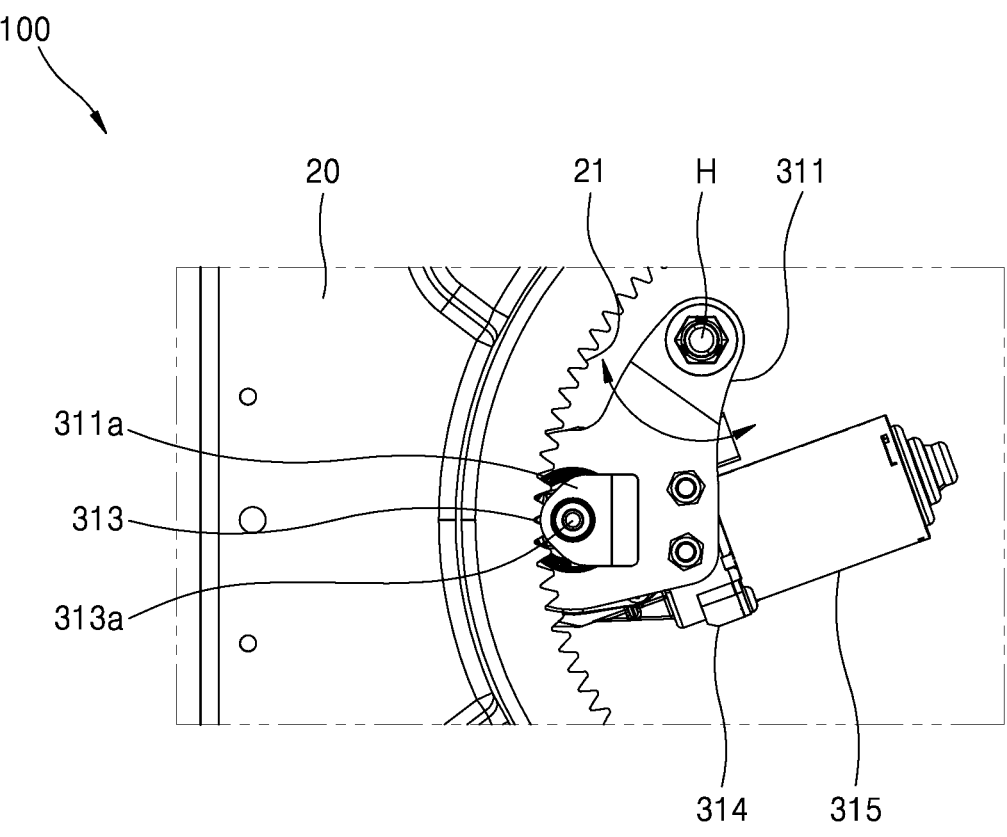
FIG. 9 is a top plan view illustrating the power swivel device of FIG. 8 with a fixing block removed.

FIG. 6 is a perspective view illustrating the variable actuator device 30 of the power swivel device 100 of FIG. 5, FIG. 7 is a part exploded perspective view illustrating the variable actuator device 30 of the power swivel device 100 of FIG. 6, FIG. 8 is a top plan view illustrating an operation process of the power swivel device 100 of FIG. 1, and FIG. 9 is a top plan view illustrating the power swivel device 100 of FIG. 8 with the fixing block 41 removed.

As shown in FIGS. 6 to 9, the variable actuator device 30 of the power swivel device 100 according to some embodiments of the present disclosure may be a rotating type variable actuator device 31 that is rotatably installed based on swing axis H installed on one side of the fixing base 10.

The rotating type variable actuator device 31 may include a rotating bracket 311, a portion of which is penetrated by swing axis H to enable rotation, and an actuator 312, which is installed on the rotating bracket 311 so that it can be rotated together with the rotating bracket 311. The actuator 312 may include a drive gear 313, a motor 315, which rotates the drive gear 313, and a reduction gear box 314, which decelerates and transmits the driving force of the motor 315 to the drive gear 313.

The rotating bracket 311 may include an axis support piece 311a formed in a portion to rotationally support a rotation axis 313a of the drive gear 313 such that two ends of the rotation axis 313a of the drive gear 313 are rigidly coupled, and a through-hole 311b formed in another portion such that a portion of the reduction gear box 314 can be pierced.

The upper end of rotation axis 313a of the drive gear 313 may be rotatably supported by a bearing installed in the axis support piece 311a, and the lower end of rotation axis 313a may be drivable supported by the through-hole 311b. Therefore, the rotating bracket 311 may rotationally support the drive gear 313 more firmly.

As shown in FIGS. 8 and 9, the variable actuator device 30 of the power swivel device 100 according to some embodiments of the present disclosure is the rotating type variable actuator device 31 that is pivotably installed relative to the swing axis H installed on one side of the fixing base

7

10. The drive gear 313 is always elastically pressurized by the elastic pressurization device 40 in the direction of the driven gear part 21, i.e., in a counterclockwise direction with respect to the swing axis H, so that even if the drive gear 313 or the driven gear part 21 is worn out by long-term use, the drive gear 313 and the driven gear part 21 may be elastically pressed together without being separated, thereby preventing spacing. Further, when a static load or dynamic load is generated externally or internally, or an impact occurs, it may be elastically mitigated through cushioning.

It is possible to prevent spacing or jamming caused by individual component tolerance, assembly tolerance, accumulated tolerance, or environment by elastically pressurizing the driven gear part 21 with the drive gear 313, prevent motor overload or malfunction by aligning the driven gear part 21 and the drive gear 313 to a precise position, improve transmission efficiency of rotational power, prevent shaking of the seat caused by a backlash, prevent collision between components, noise or vibration, and the elastic pressurization device 40 may cushion external load or impact transmitted to the seat, the rotary plate, the driven gear part and the drive gear, thereby dramatically improving durability and lifespan of the components.

In particular, elastic deformation distance of the drive gear 313 due to the elastic pressurization device 40 may be made smaller than disengagement distance to prevent gear disengagement.

Figure 10:
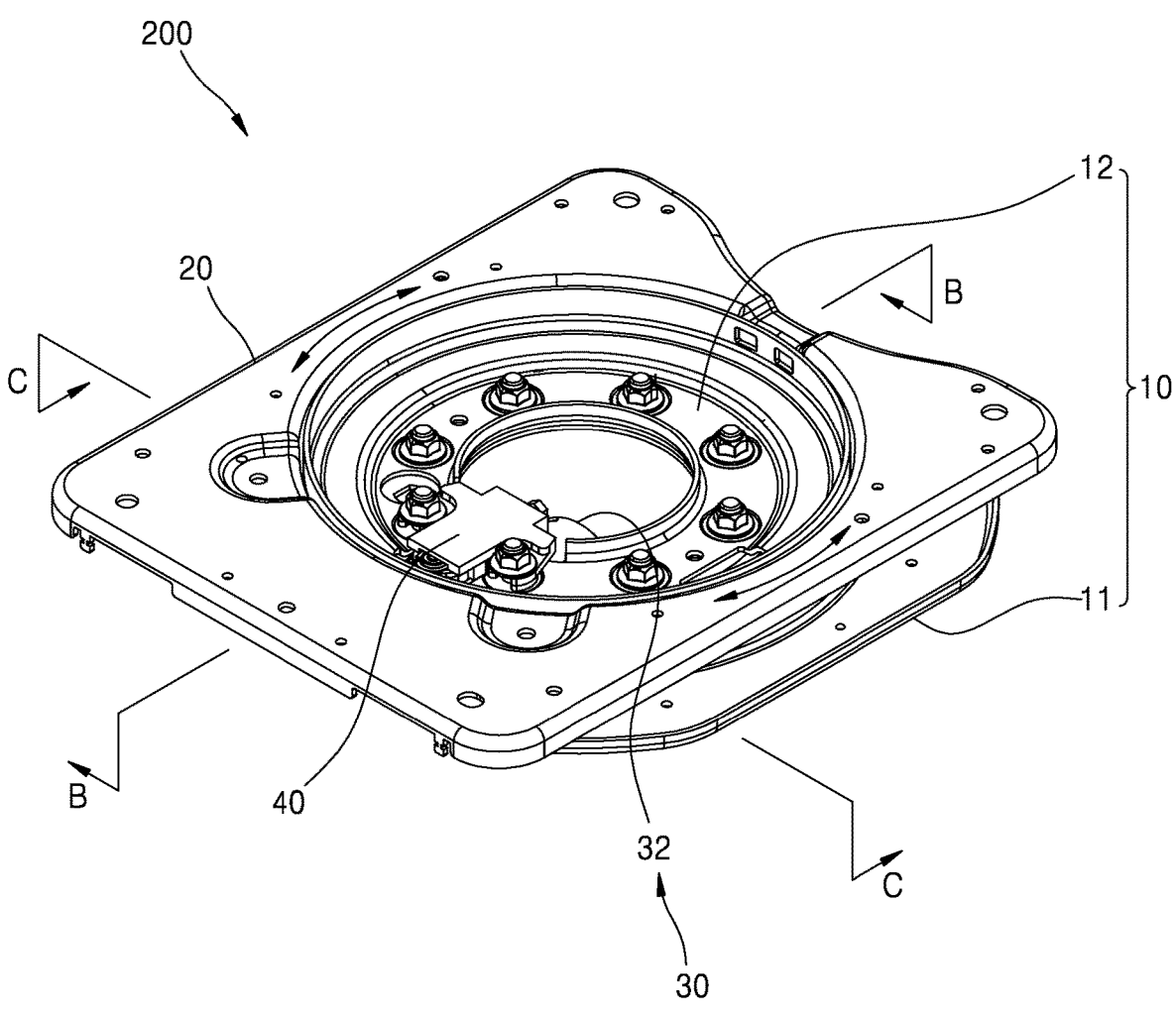
FIG. 10 is a perspective view illustrating a top surface of a power swivel device according to some other embodiments of the present disclosure.
Figure 11:
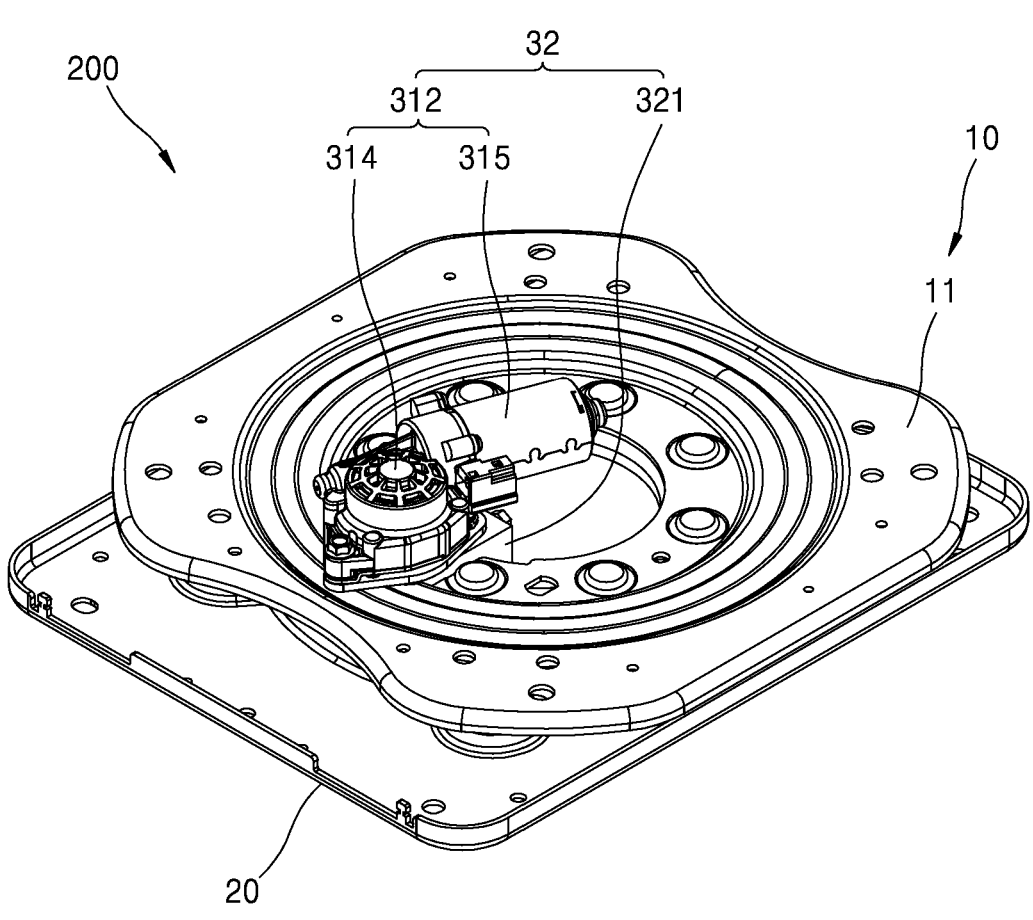
FIG. 11 is a perspective view illustrating the power swivel device of FIG. 10 inverted to show a bottom surface.
Figure 12:
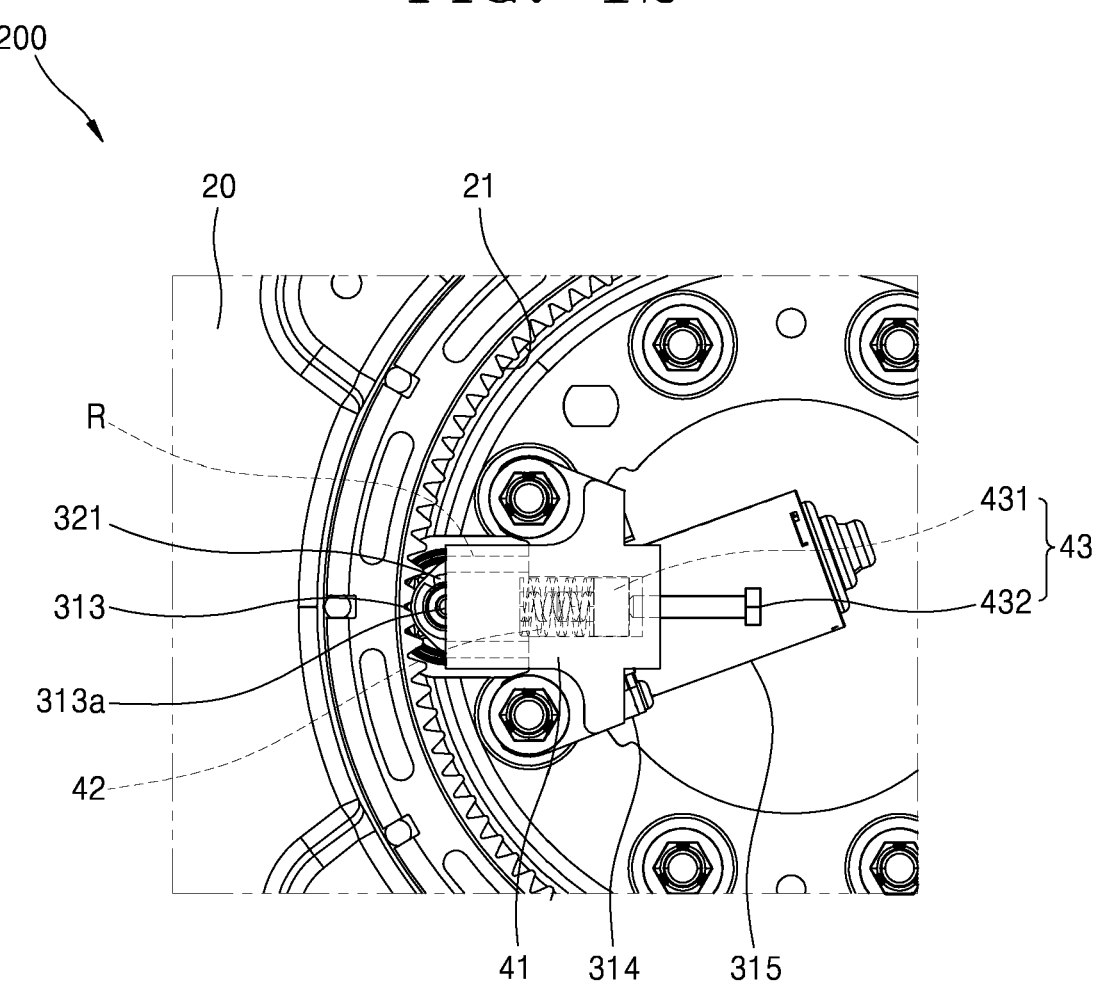
FIG. 12 is a top plan view illustrating an operation process of the power swivel device of FIG. 10.
Figure 13:
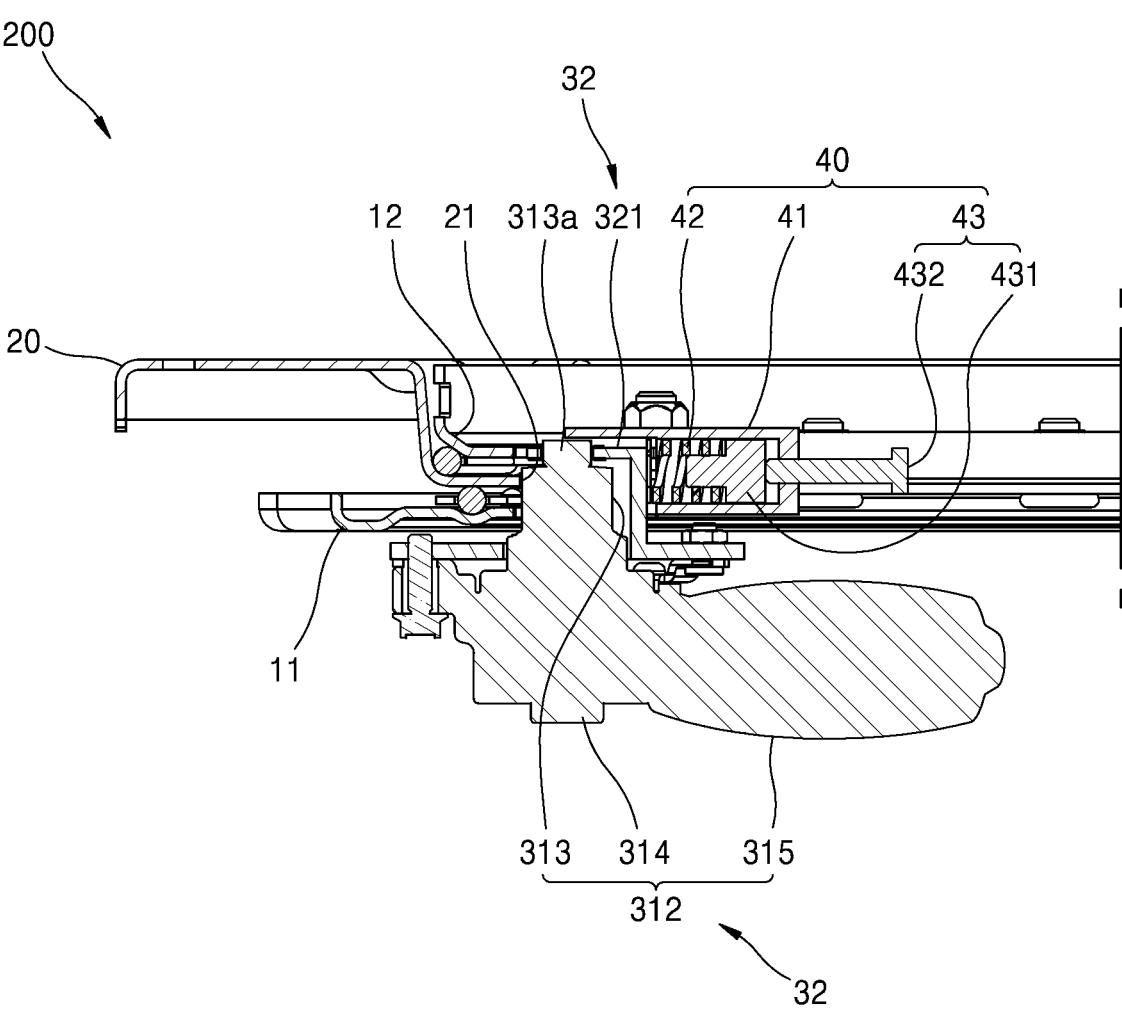
FIG. 13 is a cross-sectional view taken along a line B-B of the power swivel device of FIG. 10.
Figure 14:
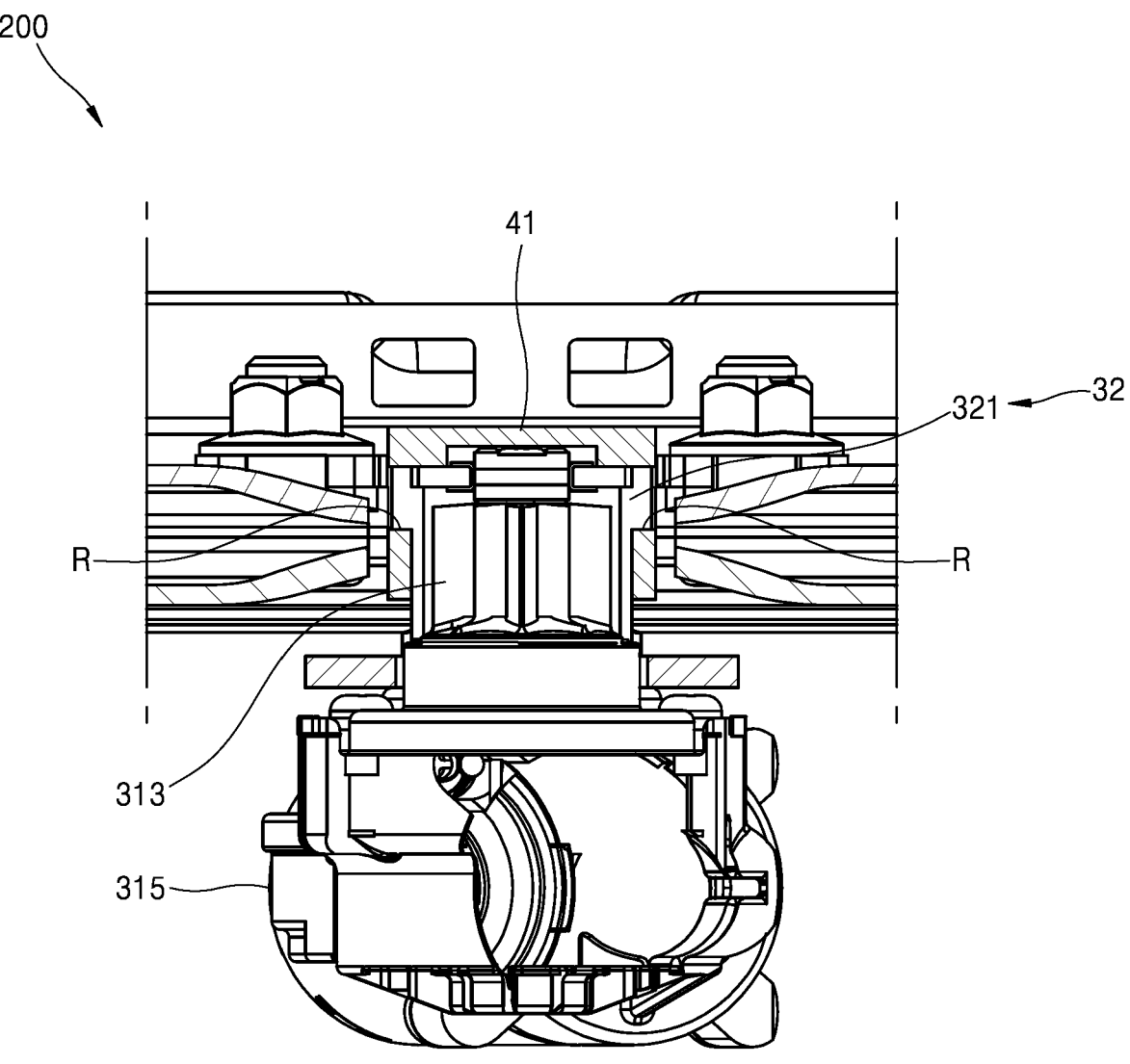
FIG. 14 is a cross-sectional view taken along a line C-C of the power swivel device of FIG. 10.

FIG. 10 is a perspective view illustrating a top surface of a power swivel device 200 according to some other embodiments of the present disclosure, FIG. 11 is a perspective view illustrating the power swivel device 200 of FIG. 10 inverted to show a bottom surface, FIG. 12 is a top plan view illustrating an operation process of the power swivel device 200 of FIG. 10, FIG. 13 is a cross-sectional view taken along a line B-B of the power swivel device 200 of FIG. 10, and FIG. 14 is a cross-sectional view taken along a line C-C of the power swivel device 200 of FIG. 10.

As shown in FIGS. 10 to 14, the variable actuator device 30 of the power swivel device 200 according to some embodiments of the present disclosure may be a sliding type variable actuator device 32 that is slidably installed with the fixing block 41 of the elastic pressurization device 40.

The sliding type variable actuator device 32 may include a sliding bracket 321, a portion of which is slidably formed along a rail part R of the fixing block 41 of the elastic pressurization device 40, and the actuator 312, which is installed on the sliding bracket 321 so that it can be slid together with the sliding bracket 321. The sliding bracket 321 may include the drive gear 313, the motor 315, which rotates the drive gear 313, and the reduction gear box 314, which decelerates and transmits the driving force of the motor 315 to the drive gear 313.

As shown in FIGS. 13 and 14, the variable actuator device 30 of the power swivel device 200 according to some embodiments of the present disclosure is the sliding type variable actuator device 32 that is installed slidably with the fixing block 41. The drive gear 313 is always slidably elastically pressurized by the elastic pressurization device 40 in the direction of the driven gear part 21, so that even if the drive gear 313 or the driven gear part 21 is worn out by long-term use, the drive gear 313 and the driven gear part 21 may be elastically pressed together without being separated, thereby preventing spacing. Further, when a static load or dynamic load is generated externally or internally, or an impact occurs, it may be elastically mitigated through cushioning.

8

Figure 15:
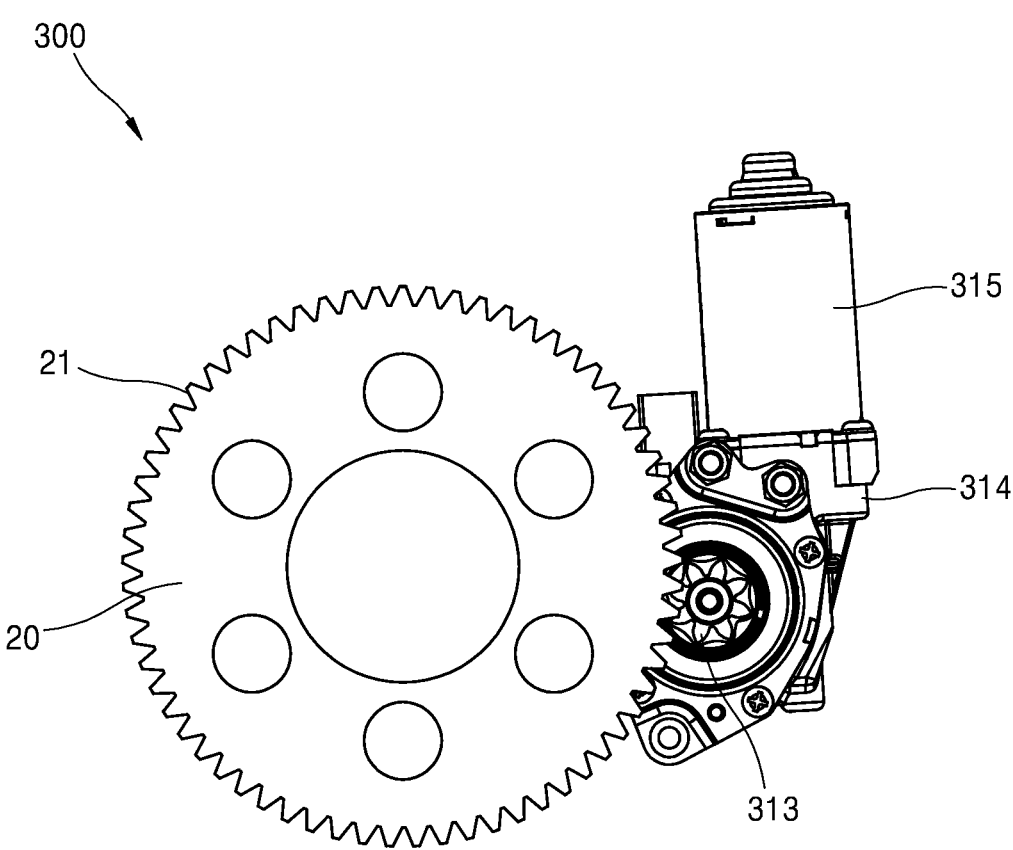
FIG. 15 is a top plan view illustrating a power swivel device according to some other embodiments of the present disclosure.

FIG. 15 is a top plan view illustrating a power swivel device 300 according to some other embodiments of the present disclosure.

As shown in FIG. 15, a rotary plate 20 of the power swivel device 300 according to some further embodiments of the present disclosure may have a ring gear shaped driven gear part 21 formed on the outer surface.

The driven gear part 21, which is formed on the outer surface of the rotary plate 20, is engaged with the drive gear 313 and may reverse rotate the engaged the rotary plate 20 when the drive gear 313 is forward rotated by the reduction gear box 314 and the motor 315.

The rotary plate 20 may also be hollow to allow wires to be passed through, and may be formed in a ring shape that is generally circular or square. However, such rotary plate 20 is not necessarily limited to these, and many different types and shapes of rotating bodies may all be applicable.

The present disclosure has been described with reference to the embodiments illustrated in the drawings, but these embodiments are merely illustrative and it should be understood by a person with ordinary skill in the art that various modifications and equivalent embodiments can be made without departing from the scope of the present disclosure. Therefore, the true technical protective scope of the present disclosure must be determined based on the technical concept of the appended claims.

REFERENCE SIGNS LIST

10: Fixing base
11: First fixing plate
12: Second fixing plate
13, 15: Retainer
14, 16: Ball bearing
20: Rotary plate
21: Driven gear part
30: Variable actuator device
31: Rotating type variable actuator device
H: Swing axis
311: Rotating bracket
311*a*: Axis support piece
31*ib*: Through-hole
312: Actuator
313: Drive gear
313*a*: Rotation axis
314: Reduction gear box
315: Motor
32: Sliding type variable actuator device
321: Sliding bracket
R: Rail part
40: Elastic pressurization device
41: Fixing block
41*a*: Opening
42: Elastic member
43: Elastic adjustment device
431: Guide
432: Elastic adjuster
100, 200, 300: Power swivel device

What is claimed is:

1. A power swivel device comprising:
a fixing base installed in a body or a seat of a vehicle;
a rotary plate rotatably installed on the fixing base and on which a driven gear part is formed on an inner surface or an outer surface;
a variable actuator device which swivels and rotates the rotary plate relative to the fixing base by utilizing a drive gear engaged with the driven gear part of the rotary plate, wherein position of the drive gear is variably installed relative to the fixing base; and an elastic pressurization device configured to elastically pressurize pressurizing the variable actuator device to enable the drive gear to be elastically pressurized in a direction to the driven gear part, wherein the elastic pressurization device comprises:

a fixing block fixed to the fixing base, having an opening formed in a direction of the variable actuator device, and defining a storage space therein; and an elastic member having at least a portion stored in the storage space of the fixing block, and having a leading end that protrudes outward from the fixing block through the opening, the elastic member configured to act on a restoring force in a direction of pressing the variable actuator device.

2. The power swivel device of claim 1, wherein the elastic pressurization device further comprises an elastic adjustment device which adjusts the restoring force of the elastic member.

3. The power swivel device of claim 2, wherein the elastic adjustment device comprises a guide which supports a rear end of the elastic member and is installed to be able to move forward and backward along the storage space of the fixing block; and an elastic adjuster which is screwed together with the fixing block to adjust forward and backward position of the guide and move the elastic member forward and backward by screwing.

4. The power swivel device of claim 1, wherein the variable actuator device is a rotating type variable actuator device which is rotatably installed based on swing axis installed on one side of the fixing base.

5. The power swivel device of claim 4, wherein the rotating type variable actuator device comprises a rotating bracket wherein a portion of which is penetrated by the swing axis to enable rotation; and an actuator which is installed on the rotating bracket so that it can be rotated together with the rotating bracket, comprising the drive gear, a motor which rotates the drive gear, and a reduction gear box which decelerates and transmits driving force of the motor to the drive gear.

6. The power swivel device of claim 5, wherein the rotating bracket comprises an axis support piece formed in a portion to rotationally support a rotation axis of the drive gear such that two ends of the drive gear are rigidly coupled, and a through-hole formed in another portion such that a portion of the reduction gear box can be pierced.

7. The power swivel device of claim 1, wherein the variable actuator device is a sliding type variable actuator device that is slidably installed with the fixing block of the elastic pressurization device.

8. The power swivel device of claim 7, wherein the sliding type variable actuator device comprises a sliding bracket wherein a portion of which is slidably formed along a rail part of the fixing base of the elastic pressurization device; and an actuator which is installed on the sliding bracket so that it can be slid together with the sliding bracket, comprising the drive gear, a motor which rotates the drive gear, and a reduction gear box which decelerates and transmits driving force of the motor to the drive gear.

9. The power swivel device of claim 1, wherein the fixing base comprises a first fixing plate which is installed on a lower side of the rotary plate; and a second fixing plate which is installed on an upper side of the rotary plate.

10. A power swivel device comprising:

a fixing base installed in a body or a seat of a vehicle;

a rotary plate rotatably installed on the fixing base and on which a driven gear part is formed on an inner surface or an outer surface;

a variable actuator device which swivels and rotates the rotary plate relative to the fixing base by utilizing a drive gear engaged with the driven gear part of the rotary plate, wherein position of the drive gear is variably installed relative to the fixing base; and an elastic pressurization device configured to elastically pressurize the variable actuator device to enable the drive gear to be elastically pressurized in a direction to the driven gear part, wherein the variable actuator device is a rotating type variable actuator device which is rotatably installed based on swing axis installed on one side of the fixing base, and wherein the rotating type variable actuator device comprises:

a rotating bracket having a portion penetrated by the swing axis to enable rotation; and an actuator installed on the rotating bracket and configured to rotate together with the rotating bracket, the actuator comprising the drive gear, a motor which rotates the drive gear, and a reduction gear box configured to decelerate and transmit driving force of the motor to the drive gear.

11. The power swivel device of claim 10, wherein the rotating bracket comprises:

an axis support piece formed in a portion to rotationally support a rotation axis of the drive gear such that two ends of the drive gear are rigidly coupled, and a through-hole formed in another portion such that a portion of the reduction gear box can be pierced.

12. The power swivel device of claim 10, wherein the variable actuator device is a sliding type variable actuator device that is slidably installed with a fixing block of the elastic pressurization device.

13. A power swivel device comprising:

a fixing base installed in a body or a seat of a vehicle;

a rotary plate rotatably installed on the fixing base and on which a driven gear part is formed on an inner surface or an outer surface;

a variable actuator device which swivels and rotates the rotary plate relative to the fixing base by utilizing a drive gear engaged with the driven gear part of the rotary plate, wherein position of the drive gear is variably installed relative to the fixing base; and an elastic pressurization device configured to elastically pressurize the variable actuator device to enable the drive gear to be elastically pressurized in a direction to the driven gear part, wherein the variable actuator device is a sliding type variable actuator device that is slidably installed with a fixing block of the elastic pressurization device.

14. The power swivel device of claim 13, wherein the sliding type variable actuator device comprises:

a sliding bracket wherein a portion of which is slidably formed along a rail part of the fixing base of the elastic pressurization device; and an actuator which is installed on the sliding bracket so that it can be slid together with the sliding bracket, comprising the drive gear, a motor which rotates the drive gear, and a reduction gear box which decelerates and transmits driving force of the motor to the drive gear.

15. The power swivel device of claim 13, wherein the fixing base comprises:

a first fixing plate which is installed on a lower side of the rotary plate; and a second fixing plate which is installed on an upper side of the rotary plate.

* * * * *